E. K. VAN CUREN.
TRAP FOR RATS, GOPHERS, AND SIMILAR SMALL GAME.
APPLICATION FILED JULY 17, 1912.
1,078,526. Patented Nov. 11, 1913.
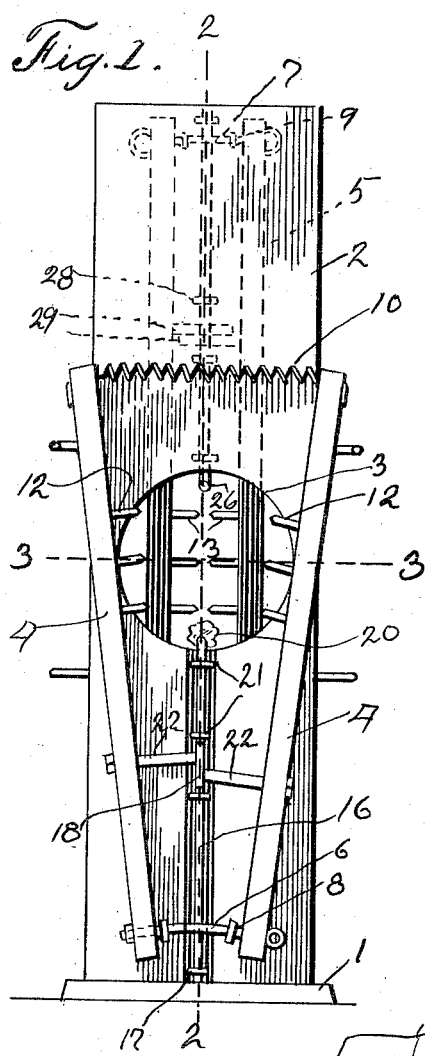
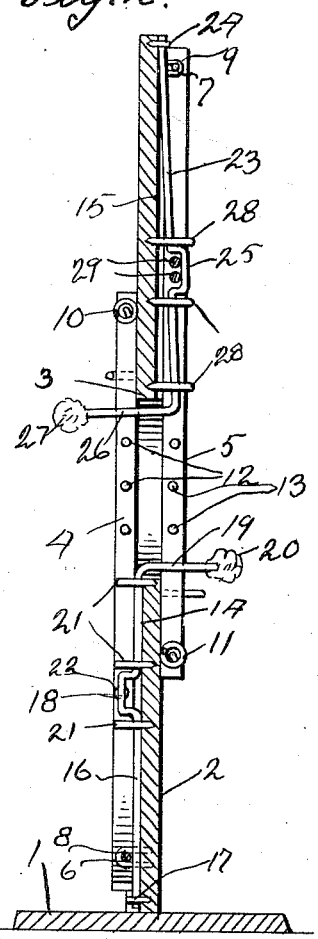
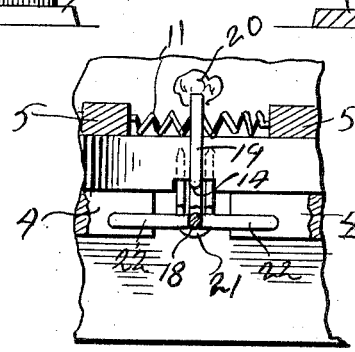
Witnesses
Francis R. MacNerhan
W. W. Cullman
Inventor
E. K. Van Curen
By L. Randolph Jr.
Attorney

UNITED STATES PATENT OFFICE.

ELZA K. VAN CUREN, OF BAIRDSTOWN, CALIFORNIA, ASSIGNOR TO MARY S. VAN CUREN, OF SANTA MONICA, CALIFORNIA.

TRAP FOR RATS, GOPHERS, AND SIMILAR SMALL GAME.

1,078,526. Specification of Letters Patent. Patented Nov. 11, 1913.

Application filed July 17, 1912. Serial No. 709,981.

*To all whom it may concern:*

Be it known that I, ELZA K. VAN CUREN, a citizen of the United States, residing at Bairdstown, in the county of Los Angeles and State of California, have invented certain new and useful Improvements in Traps for Rats, Gophers, and Similar Small Game, of which the following is a specification.

My invention relates to traps for catching rats, gophers and other small animals, and has for its object the provision of an improved trap that is so constructed as to surely catch and securely hold small animals and is likewise so constructed that the animal is practically instantaneously killed to prevent the animal from needless suffering.

My invention will be described in detail hereinafter and illustrated in the accompanying drawings, in which,—

Figure 1 is a side view in elevation of my improved trap; Fig. 2, a vertical sectional view on the plane indicated by the line 2—2 of Fig. 1; and Fig. 3, a cross section on the plane indicated by the line 3—3 of Fig. 1.

In the drawings similar reference characters will be used to designate corresponding parts throughout the several views.

My improved trap consists of a base 1 having an upright 2 secured thereto and provided with an opening 3. 4 and 5 indicate pairs of arms having one of their terminals connected by means of flexible rods 6 and 7, and secured to the upright 2 by means of staples 8 and 9 engaging said rods. The other terminals of the rods 4 and 5 are connected by means of retractile coil springs 10 and 11 and each of the rods are provided with spikes 12 and 13 secured intermediate of their terminals and on the adjacent sides thereof, said spikes being arranged opposite the opening 3 in the upright 2. One side of the upright 2 below the opening 3 is provided with a central longitudinal groove 14 extending from said opening downwardly to the base 1, while the other side of said upright is provided with a central longitudinal groove 15 that extends from the opening 3 upwardly to the upper terminal of said upright.

Mounted in the groove 14 is a rod 16 having one of its terminals secured to the upright 2 by means of a staple or other suitable fastening 17, and provided with an offset portion 18 intermediate of its ends, while its upper terminal is bent at substantially a right angle to the main portion of the rod and extended through the opening 3 as shown at 19, said end 19 being adapted to receive a bait 20. The rod 16 is preferably formed of a flexible material and oscillates between guides 21 secured to the upright 2. The rods 4 have secured thereto pins or projections 22 that are unalined relatively to one another and adapted to engage the offset 18 when the trap is in a set position as shown in Fig. 1 as to the arms 4.

Mounted in the groove 15 is another rod designated 23 secured by one of its terminals to the upright 2 by means of a staple 24 or other suitable fastening, said rod 23 having an offset portion 25 intermediate of its ends and its free terminal bent at substantially a right angle to the secured portion of the rod and extended through the opening 3 as shown at 26, said extended portion 26 being adapted to receive a bait 27. The rod 23 is also constructed of flexible material and is adapted to oscillate between the loop guides 28 secured to the upright 2.

29 indicates pins or projections secured to the arms 5 and adapted to engage the offset portion 25 of the rod 23 when said rods 5 are in a set position, said rods being, however, shown in a sprung position in Figs. 1 and 2 of the drawings.

In setting the trap, it will be apparent that the arms 4 and 5 are moved away from one another manually until the free terminals of the pins 22 and 29 release the offset portions 18 and 25 of the rods 16 and 23, when said rods will spring into position against the upright 2 and said offset portions 18 and 25 will engage the terminals of said pins 22 and 29 and hold the arms 4 and 5 in their outwardly extended positions, and bait having previously been secured to the ends 19 and 26 of the rods 16 and 23, the trap will be set and remain in that position until the rods 16 or 23 are moved from their positions against the upright 2 by an animal trying to secure the bait.

An animal approaching the trap from either side will obviously be attracted by the bait extending from the side nearest to him, and after eating the bait and knowing that no ill results followed his actions, will reach through the opening 3 and endeavor to secure the bait on the end of the other rod. By so doing, he will move the rod away from the upright 2 and thereby release the two arms on the side of the upright 2 through which his head extends and the spikes 12 or 13 will engage him in the neck with sufficient force to break his spinal column and thereby instantaneously kill him.

Having thus described the invention what I claim is:—

1. In a trap, a base, an upright secured to said base and having an opening therein to receive the animal's head, pairs of arms pivotally secured to opposite sides of said upright and having spikes secured thereto opposite the opening aforesaid, and a separate trigger for each pair of arms, each of said triggers having a portion thereof extended through the opening aforesaid and adapted to receive a bait.

2. A trap comprising a base, an upright mounted on said base and having an opening therein to receive the animal's head, pairs of arms pivotally secured to the two sides of said upright and having spikes secured thereto opposite the opening aforesaid, springs connecting the arms in pairs and normally tending to move said arms toward one another, flexible rods having one of their terminals secured to said upright, said rods having offset portions intermediate of the ends thereof and the free terminal of each rod bent at a right angle to the secured portion of the rod and adapted to receive a bait, said extended terminals of the rods extending through the opening aforesaid in opposite directions, and pins secured to said arms and adapted to engage said offset portions of the rods when said rods are in a set position.

In testimony whereof I affix my signature in presence of two witnesses.

ELZA K. VAN CUREN.

Witnesses:
 GEORGE CLEMENS,
 ERNEST B. GREGORY.

---

Copies of this patent may be obtained for five cents each, by addressing the "Commissioner of Patents, Washington, D. C."